US012594221B2

(12) United States Patent
McKinnon et al.

(10) Patent No.: US 12,594,221 B2
(45) **Date of Patent: *Apr. 7, 2026**

(54) CONNECTION ARRANGEMENT FOR CLOSED SYSTEM TRANSFER OF FLUIDS

(71) Applicant: Becton Dickinson and Company Limited, Dun Laoghaire (IE)

(72) Inventors: Austin Jason McKinnon, Herriman, UT (US); Milan Ivosevic, Kinnelon, NJ (US)

(73) Assignee: Becton Dickinson and Company Limited, Dun Laoghaire (IE)

(*) Notice: Subject to any disclaimer, the term of this patent is extended or adjusted under 35 U.S.C. 154(b) by 337 days.

This patent is subject to a terminal disclaimer.

(21) Appl. No.: 17/861,851

(22) Filed: Jul. 11, 2022

(65) Prior Publication Data

US 2022/0339069 A1 Oct. 27, 2022

Related U.S. Application Data

(63) Continuation of application No. 16/357,996, filed on Mar. 19, 2019, now Pat. No. 11,413,216.

(Continued)

(51) Int. Cl.
*A61J 1/20* (2006.01)
*A61J 1/14* (2023.01)

(52) U.S. Cl.
CPC .......... *A61J 1/2096* (2013.01); *A61J 1/1406* (2013.01); *A61J 1/201* (2015.05); *A61J 1/202* (2015.05); *A61J 1/2048* (2015.05)

(58) Field of Classification Search
CPC .......... A61J 1/2096; A61J 1/201; A61J 1/202; A61J 1/2048; A61J 1/2055; A61J 1/2051
See application file for complete search history.

(56) References Cited

U.S. PATENT DOCUMENTS 4,005,739 A 2/1977 Winchell
4,068,696 A 1/1978 Winchell
(Continued)

FOREIGN PATENT DOCUMENTS

CN 1305071 A 7/2001
ES 2286376 T3 12/2007
(Continued)

OTHER PUBLICATIONS

Hubsch//Kirschner, "German Opposition to European Patent re: EP 3768221", Jul. 24, 2024.

*Primary Examiner* — Timothy P. Kelly
(74) *Attorney, Agent, or Firm* — The Webb Law Firm

(57) ABSTRACT

A system for closed transfer of fluids includes a vial adapter having a body with a first end and a second end, a vial connection extending from the second end of the body, with the vial connection configured to secure the body to a vial, a vial spike extending from the second end of the body, with the vial spike defining a passageway, and a collet connection extending from the first end of the body. The system further includes a syringe adapter including a housing having a first end and a second end, a membrane housing positioned within the housing, with the membrane housing moveable between a first position and a second position, a cannula positioned within the housing, and a syringe connection extending from the first end of the housing, with the syringe connection configured to be secured to a syringe barrel.

10 Claims, 8 Drawing Sheets

Related U.S. Application Data

(60) Provisional application No. 62/645,279, filed on Mar. 20, 2018.

(56) References Cited

U.S. PATENT DOCUMENTS

| | | | | |
|---|---|---|---|---|
| 4,373,559 | A | 2/1983 | Mowles et al. | |
| 4,507,113 | A | 3/1985 | Dunlap | |
| 4,759,756 | A | 7/1988 | Forman et al. | |
| 5,888,200 | A | 3/1999 | Walen | |
| 6,142,446 | A | 11/2000 | Leinsing | |
| 6,210,369 | B1 | 4/2001 | Wilmot et al. | |
| 8,122,923 | B2 | 2/2012 | Kraus et al. | |
| 10,406,072 | B2 | 9/2019 | Chhikara et al. | |
| 10,434,034 | B2 | 10/2019 | Cederschiold | |
| 10,918,849 | B2 | 2/2021 | McKinnon et al. | |
| 2004/0024354 | A1 | 2/2004 | Reynolds | |
| 2004/0162540 | A1* | 8/2004 | Walenciak | A61B 5/150473 604/411 |
| 2008/0100061 | A1 | 5/2008 | Sage et al. | |
| 2009/0001676 | A1 | 1/2009 | Hermle et al. | |
| 2010/0160894 | A1 | 6/2010 | Julian et al. | |
| 2010/0218846 | A1 | 9/2010 | Kriheli | |
| 2010/0241088 | A1 | 9/2010 | Ranalletta et al. | |
| 2011/0106046 | A1 | 5/2011 | Hiranuma et al. | |
| 2012/0179128 | A1 | 7/2012 | Takemoto et al. | |
| 2012/0251877 | A1 | 10/2012 | Wu et al. | |
| 2014/0261877 | A1 | 9/2014 | Ivosevic et al. | |
| 2015/0126958 | A1* | 5/2015 | Sanders | A61M 39/10 285/330 |
| 2015/0250681 | A1 | 9/2015 | Lev et al. | |
| 2015/0297456 | A1 | 10/2015 | Marici et al. | |
| 2015/0297839 | A1 | 10/2015 | Sanders et al. | |
| 2016/0206512 | A1 | 7/2016 | Chhikara et al. | |

FOREIGN PATENT DOCUMENTS

| | | | |
|---|---|---|---|
| JP | 200785471 | A | 4/2007 |
| JP | 2007260162 | A | 10/2007 |
| JP | 2016524987 | A | 8/2016 |
| WO | 2014009556 | A2 | 1/2014 |
| WO | 2015009746 | A2 | 1/2015 |
| WO | 2015069643 | A1 | 5/2015 |

* cited by examiner

CONNECTION ARRANGEMENT FOR CLOSED SYSTEM TRANSFER OF FLUIDS

CROSS-REFERENCE TO RELATED APPLICATION

This application is a continuation of U.S. application Ser. No. 16/357,996, entitled "Connection Arrangement for Closed System Transfer of Fluids", filed Mar. 19, 2019, which claims priority to U.S. Provisional Application Ser. No. 62/645,279, entitled "Connection Arrangement for Closed System Transfer of Fluids", filed Mar. 20, 2018, the entire disclosures of each of which are hereby incorporated by reference in their entirety.

BACKGROUND OF THE INVENTION

Field of the Disclosure

The present disclosure relates generally to a system for the closed transfer of fluids. More particularly, the present disclosure relates to a system that provides leak-proof sealing during fluid transfer from a first container to a second container.

Description of the Related Art

Health care providers reconstituting, transporting, and administering hazardous drugs, such as cancer treatments, can put health care providers at risk of exposure to these medications and present a major hazard in the health care environment. For example, nurses treating cancer patients risk being exposed to chemotherapy drugs and their toxic effects. Unintentional chemotherapy exposure can affect the nervous system, impair the reproductive system, and bring an increased risk of developing blood cancers in the future. In order to reduce the risk of health care providers being exposed to toxic drugs, the closed transfer of these drugs becomes important.

Some drugs must be dissolved or diluted before they are administered, which involves transferring a solvent from one container to a sealed vial containing the drug in powder or liquid form, by means of a needle. Drugs may be inadvertently released into the atmosphere in gas form or by way of aerosolization, during the withdrawal of the needle from the vial and while the needle is inside the vial if any pressure differential between the interior of the vial and the surrounding atmosphere exists.

SUMMARY OF THE INVENTION

In one aspect, a system for closed transfer of fluids includes a vial adapter having a body having a first end and a second end, a vial connection extending from the second end of the body, with the vial connection configured to secure the body to a vial, a vial spike extending from the second end of the body, with the vial spike defining a passageway, and a collet connection extending from the first end of the body. The system further includes a syringe adapter having a housing having a first end and a second end, a membrane housing positioned within the housing, with the membrane housing moveable between a first position and a second position and including at least one membrane, and a cannula positioned within the housing, with the cannula having a first end and a second end. The second end of the cannula is positioned within the membrane housing when the membrane housing is in the first position and is positioned outside of the membrane housing when the membrane housing is in the second position. The syringe adapter further includes a syringe connection extending from the first end of the housing, with the syringe connection configured to be secured to a syringe barrel. The collet connection is configured to be secured to the membrane housing.

The collet connection may be moveable between a first position where the collet connection is configured to receive the membrane housing and a second position where the collet connection is configured to be secured to the membrane housing. The housing of the syringe adapter may include a first portion positioned adjacent to the first end of the housing and a second portion position adjacent to the second end of the housing, with the first portion of the housing having a smaller internal diameter relative to the internal diameter of the second portion of the housing. The collet connection is in the first position when the collet connection is positioned within the second portion of the housing and in the second position when the collet connection is positioned within the first portion of the housing. The collet connection may be moveable radially inward when transitioning from the first position to the second position.

The housing may include a transition portion positioned between the first and second portions of the housing, with the transition portion configured to engage the collet connection to move the collet connection from the first position to the second position when the collet connection is positioned within the housing of the syringe adapter. The transition portion may be frusto-conical.

The collet connection may include a collet body and first and second arms extending from the collet body away from the first end of the body of the vial adapter, with the first and second arms defining a space configured to receive the membrane housing. The first and second arms each include a projection extending radially inward, with the projection configured to engage the membrane housing when the collet connection is in the second position with the membrane housing received within the space. The collet body may define a passageway in fluid communication with the vial spike, with the collet body further including a collet membrane configured to engage the membrane of the of the syringe adapter. The vial adapter may include a collet housing extending from the first end of the body, with the collet connection positioned within the collet housing and the collet housing configured to receive a portion of the housing of the syringe adapter.

The collet housing may define an indicator opening and the housing of the syringe adapter may include an indicator, with the indicator configured to be visible via the indicator opening when the collet connection is in the second position.

The vial adapter may include a projection configured to engage a corresponding projection within the housing of the syringe adapter to secure the vial adapter to the syringe adapter.

The system may further include a patient connector having a body having a first end and a second end, a patient connection configured to secure the body to a patient line, and a collet connection, with the collet connection of the patient connector configured to be secured to the membrane housing of the syringe adapter.

In a further aspect, a vial adapter includes a body having a first end and a second end, a vial connection extending from the second end of the body, with the vial connection configured to secure the body to a vial, a vial spike extending from the second end of the body, with the vial spike defining a passageway, and a collet connection extending from the first end of the body, with the collet connection configured to be secured to a syringe adapter.

The collet connection may be moveable between a first position where the collet connection has a first radial position and a second position where the collet connection has a second radial position. The collet connection may be moveable radially inward when transitioning from the first position to the second position. The collet connection may include a collet body and first and second arms extending from the collet body away, with the first and second arms defining a space configured to receive a portion of a syringe adapter. The first and second arms may each include a projection extending radially inward. The collet body may define a passageway in fluid communication with the vial spike, with the collet body further comprising a collet membrane. The vial adapter may include a collet housing extending from the first end of the body, with the collet connection positioned within the collet housing and the collet housing configured to receive a portion of a syringe adapter.

BRIEF DESCRIPTION OF THE DRAWINGS

The above-mentioned and other features and advantages of this disclosure, and the manner of attaining them, will become more apparent and the disclosure itself will be better understood by reference to the following descriptions of aspects of the disclosure taken in conjunction with the accompanying drawings, wherein.

Corresponding reference characters indicate corresponding parts throughout the several views. The exemplifications set out herein illustrate exemplary aspects of the disclosure, and such exemplifications are not to be construed as limiting the scope of the disclosure in any manner.

DETAILED DESCRIPTION

Figure 1:
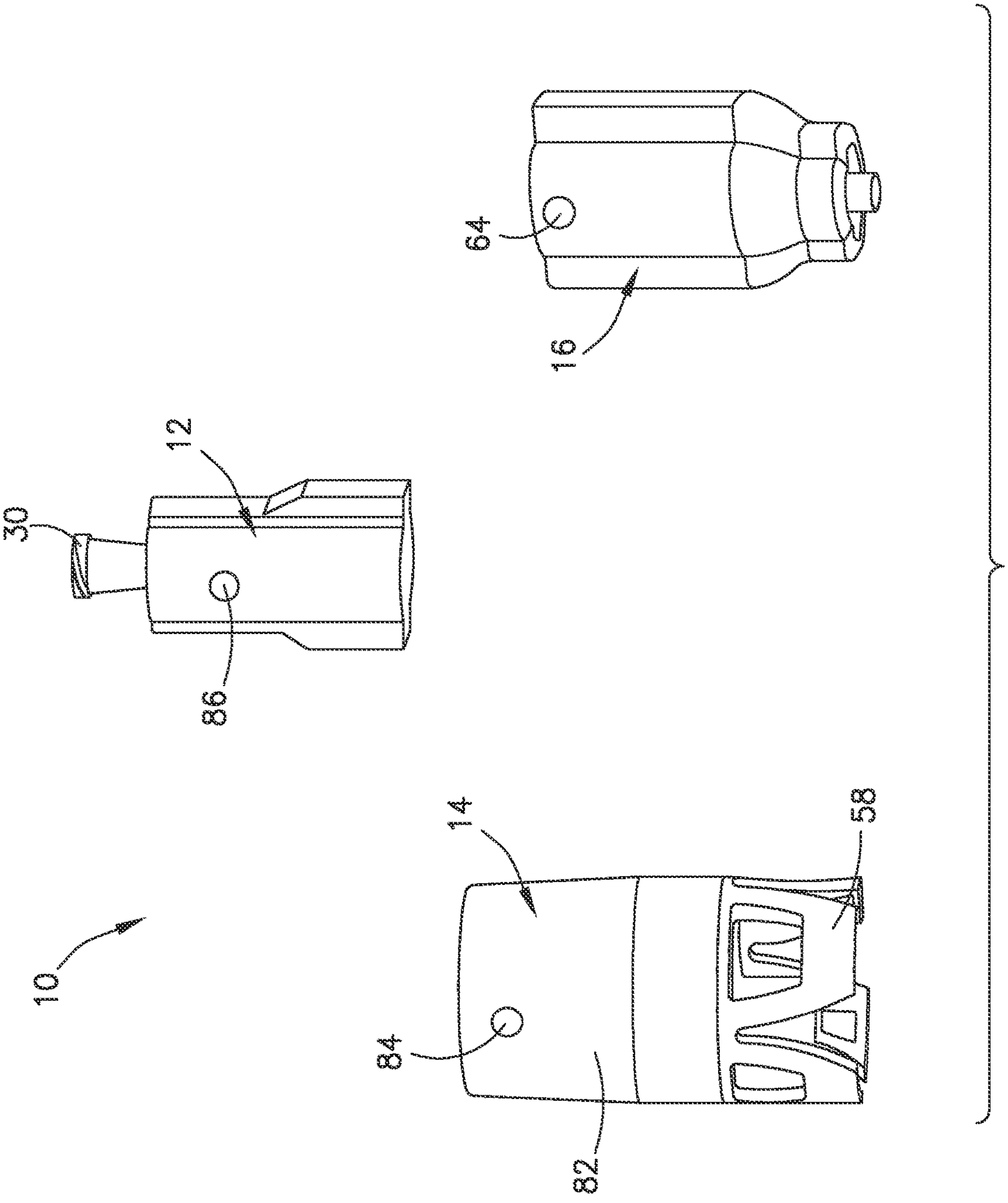
FIG. 1 is a perspective view of a system for the closed transfer of fluids according to one aspect of the present invention.

The following description is provided to enable those skilled in the art to make and use the described aspects contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms “upper”, “lower”, “right”, “left”, “vertical”, “horizontal”, “top”, “bottom”, “lateral”, “longitudinal”, and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

Referring to FIGS. 1-6, a system 10 for the closed transfer of fluids includes a syringe adapter 12, a vial adapter 14, and a patient connector 16, although the system may include other components, including, but not limited to, IV bag spikes and IV line access devices. The system 10 facilitates the closed transfer of fluids between various containers, such as syringes, vials, IV bags, etc. For example, the syringe adapter 12 may be secured to a syringe (not shown) and the vial adapter 14 may be secured to a vial (not shown) containing a medicament. As discussed below, the syringe adapter 12 may be connected to the vial adapter 14 to transfer the medicament from the vial to the syringe while preventing the escape of the medicament from the system 10 and possible exposure to the medicament by the user of the system.

Referring to FIGS. 1-4, the syringe adapter 12 includes a housing 20 having a first end 22 and a second end 24, a membrane housing 26 positioned within the housing 20, a cannula 28 positioned within the housing 20, and a syringe connection 30 extending from the first end 22 of the housing 20. The membrane housing 26 is moveable between a first position and a second position within the housing 20. The first position of the membrane housing 26 may be adjacent to the first end 22 of the housing 20 and the second position may be a position intermediate the first and second ends 22, 24 of the housing 20. The membrane housing 26 receives first and second membranes 32, 34 to define a space between the membranes 32, 34, although the membrane housing 26 may include one or more membranes. The cannula 28 has a first end 36 and a second end 38, with the second end 38 of the cannula 28 positioned within the membrane housing 26 and between the first and second membranes 32, 34 when the membrane housing 26 is in the first position and positioned outside of the membrane housing 26 when the membrane housing 26 is in the second position. The second end 38 of the cannula 28 is shown as a blunt end, which is configured to push through a pre-slit membrane, although the second end 38 of the cannula 28 may also be a pointed end configured to pierce a membrane. The first end 36 of the cannula 28 is connected to and in fluid communication with the syringe connection 30. The syringe connection 30 is configured to be secured to a syringe barrel (not shown). The syringe connection 30 may be a female luer connection, although other suitable connections may be utilized. The membrane housing 26 may move along a track defined by an interior surface of the housing 20 such that the movement of the membrane housing 26 is limited to movement between the first and second positions of the membrane housing 26.

The housing 20 of the syringe adapter 12 includes first portion 40 positioned adjacent to the first end 22 of the housing 20 and a second portion 42 positioned adjacent to the second end 24 of the housing 20. The first portion 40 of the housing 20 has a smaller internal diameter relative to the internal diameter of the second portion 42 of the housing 20. The housing 20 includes a transition portion 44 positioned between the first and second portions 40, 42 of the housing 20. The transition portion 44 may be frusto-conical, although other suitable shapes and configurations may be utilized.

Referring again to FIGS. 1-4, the vial adapter 14 includes a body 52 having a first end 54 and a second end 56, a vial connection 58 extending from the second end 56 of the body 52, a vial spike 60 extending from the second end 56 of the body 52, and a collet connection 62 extending from the first end 54 of the body 52. The vial connection 58 is configured to secure the body 52 of the vial adapter 52 to a vial or other container. The vial spike 60 defines a passageway 64 in fluid communication with the collet connection 62. The collet connection 62 is configured to be secured to the membrane housing 26 of the syringe adapter 12. The collet connection 62 is moveable between a first position where the collet connection 62 is configured to receive the membrane housing 26 and a second position where the collet connection 62 is configured to be secured to the membrane housing 26. The collet connection 62 includes a collet body 70 and first and second arms 72, 74 extending from the collet body 70 away from the first end 54 of the body 52 of the vial adapter 14, although the collet connection 62 may include one or more arms. As shown in FIGS. 3 and 4, the first and second arms 72, 74 defines a space configured to receive the membrane housing 26. The collet connection 62 is in the first position (shown in FIG. 3) when the collet connection 62 is positioned within the second portion 42 of the housing 20 and is in the second position (shown in FIG. 4) when the collet connection 62 is positioned within the first portion 40 of the housing 20. The collet connection 62 is moveable radially inward when transitioned from the first position to the second position. As shown in FIG. 3, the arms 72, 74 of the collet connection 62 engage the transition portion 44 of the housing 20 of the syringe adapter 12 to move the arms 72, 74 from the first position to the second position when the collet connection 62 is positioned within the housing 20 of the syringe adapter 12.

The first and second arms 72, 74 of the collet connection 62 each include a projection 76 extending radially inward, with the projection 76 configured to engage the membrane housing 26 when the collet connection 62 is in the second position with the membrane housing 26 received within the space define by the legs 72, 74. The collet body 70 defines a passageway 78 in fluid communication with the vial spike 60. The collet body 70 further includes a collet membrane 80 that seals the passageway 78 of the collet body 70 and is configured to engage the second membrane 34 of the syringe adapter 26. In particular, when the collet connection 62 is in the second position and the membrane housing 26 in the second position, the syringe adapter 12 is secured to the vial adapter 14 with the arms 72, 74 of the collet connection 62 forced inward by the first portion 40 of the housing 20, which compresses the second membrane 34 against the collet membrane 80 to form a sealed connection. When the membrane housing 26 is in the second position and engaged with the collet connection 62, the second end 38 of the cannula 28 pushes through the second membrane 34, the collet membrane 80, and into the passageway 78 of the collet body 70 to place the cannula 28 in fluid communication with the vial spike 60.

The vial adapter 14 also includes a collet housing 82 extending from the first end 54 of the body 52, with the collet connection 62 positioned within the collet housing 82. The collet housing 82 receives a portion of the housing 20 of the syringe adapter 12 when the vial adapter 14 is connected to the syringe adapter 12, i.e., when the collet connection 62 is secured to the membrane housing 26. The collet housing 82 defines an indicator opening 84 and the housing 20 of the syringe adapter 12 includes an indicator 86. The indicator 86 is visible via the indicator opening 84 when the collet connection 62 is in the second position and secured to the membrane housing 26 to provide an indication to a user that the vial adapter 14 is properly connected to the syringe adapter 12.

Although not shown, the vial adapter 14 may also include a pressure equalization arrangement that is configured to prevent pressure changes within a vial during transfer of fluid from the vial to a syringe via the vial adapter and syringe adapter. Typically, such pressure equalization arrangements utilize a separate vent channel within the vial spike 60 that communicates with an expandable reservoir attached to or formed integrally with the vial adapter 14. The expandable reservoir may be filled with air prior to the withdrawal of fluid from a vial such that air is drawn from the expandable reservoir into the vial thereby preventing a vacuum from being formed within the vial, which can deform the neck of the vial and possible allow the escape of medicament from the vial. Similarly, if the medicament within the vial needs reconstituted, the injection of diluent into the vial displaces air from the vial into the expandable reservoir rather than pressurizing the vial and possibly causing the medicament to aerosolize.

Figure 6:
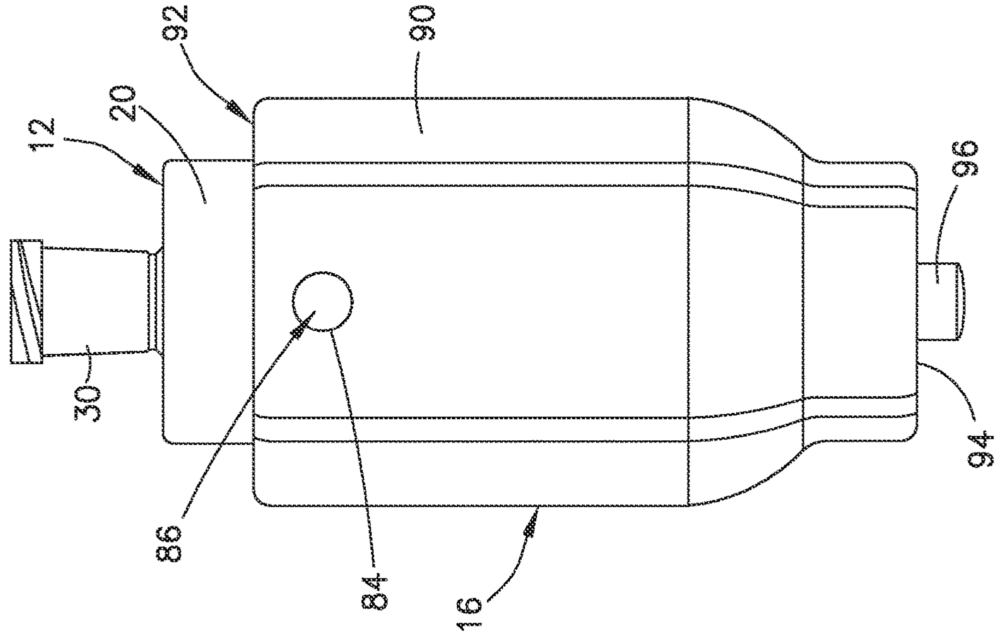
FIG. 6 is a front view of a syringe adapter and a patient adapter according to one aspect of the present invention, showing an indicator feature in a second position.
Figure 5:
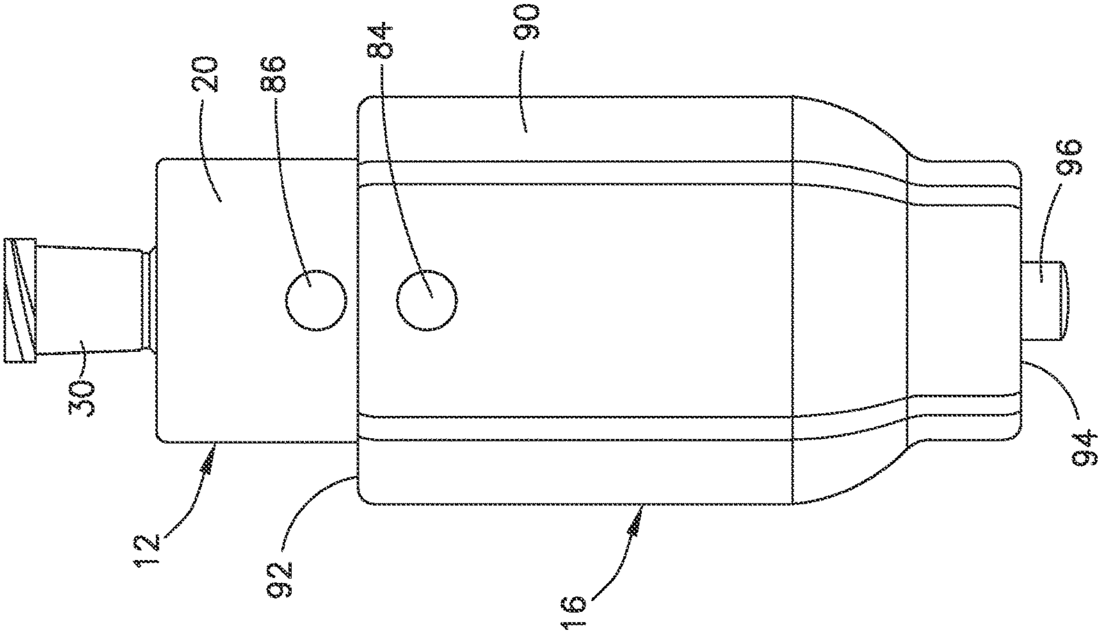
FIG. 5 is a front view of a syringe adapter and a patient adapter according to one aspect of the present invention, showing an indicator feature in a first position.
Figure 8:
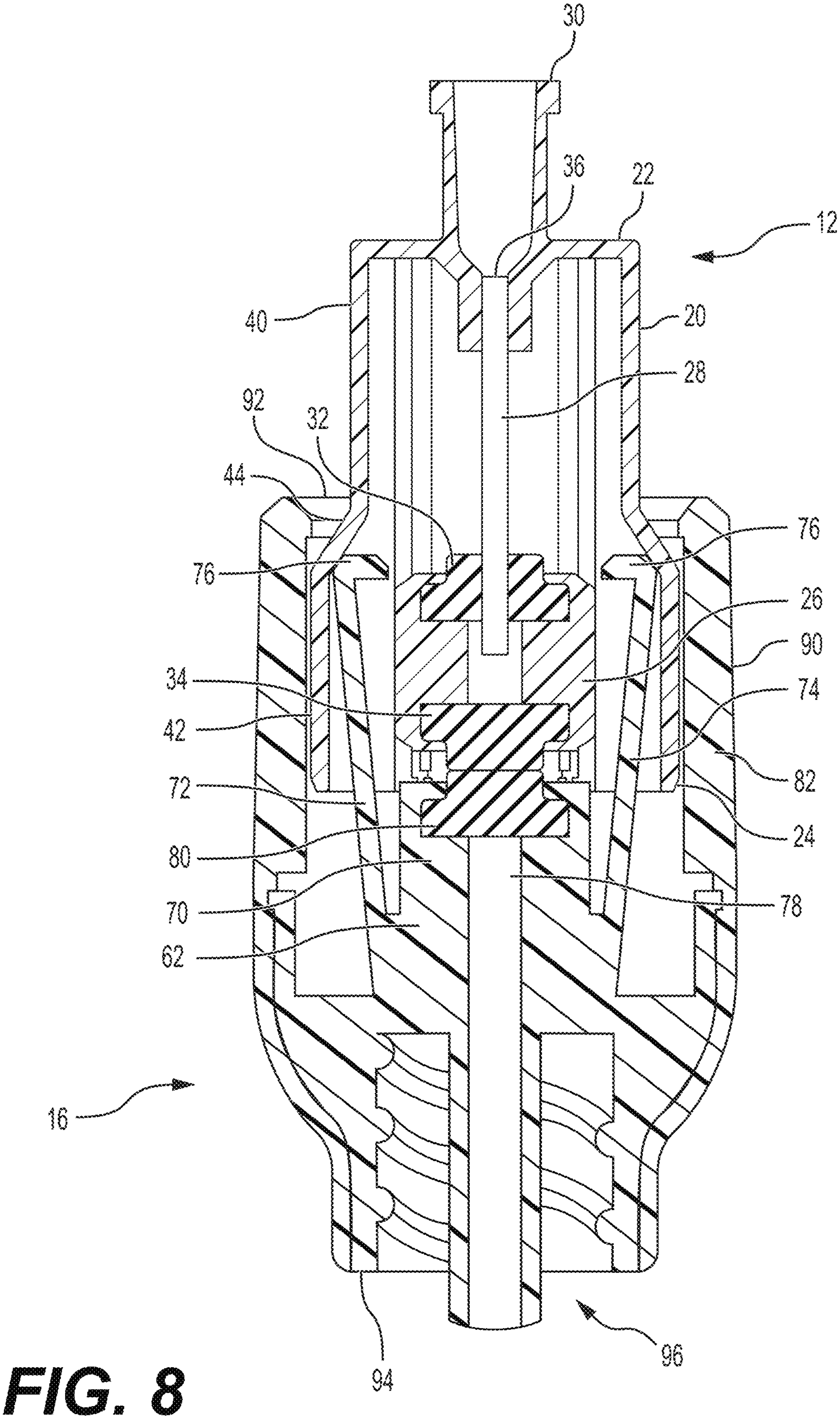
FIG. 8 is a cross-sectional view of a syringe adapter and a patient connector according to one aspect of the present invention.
Figure 9:
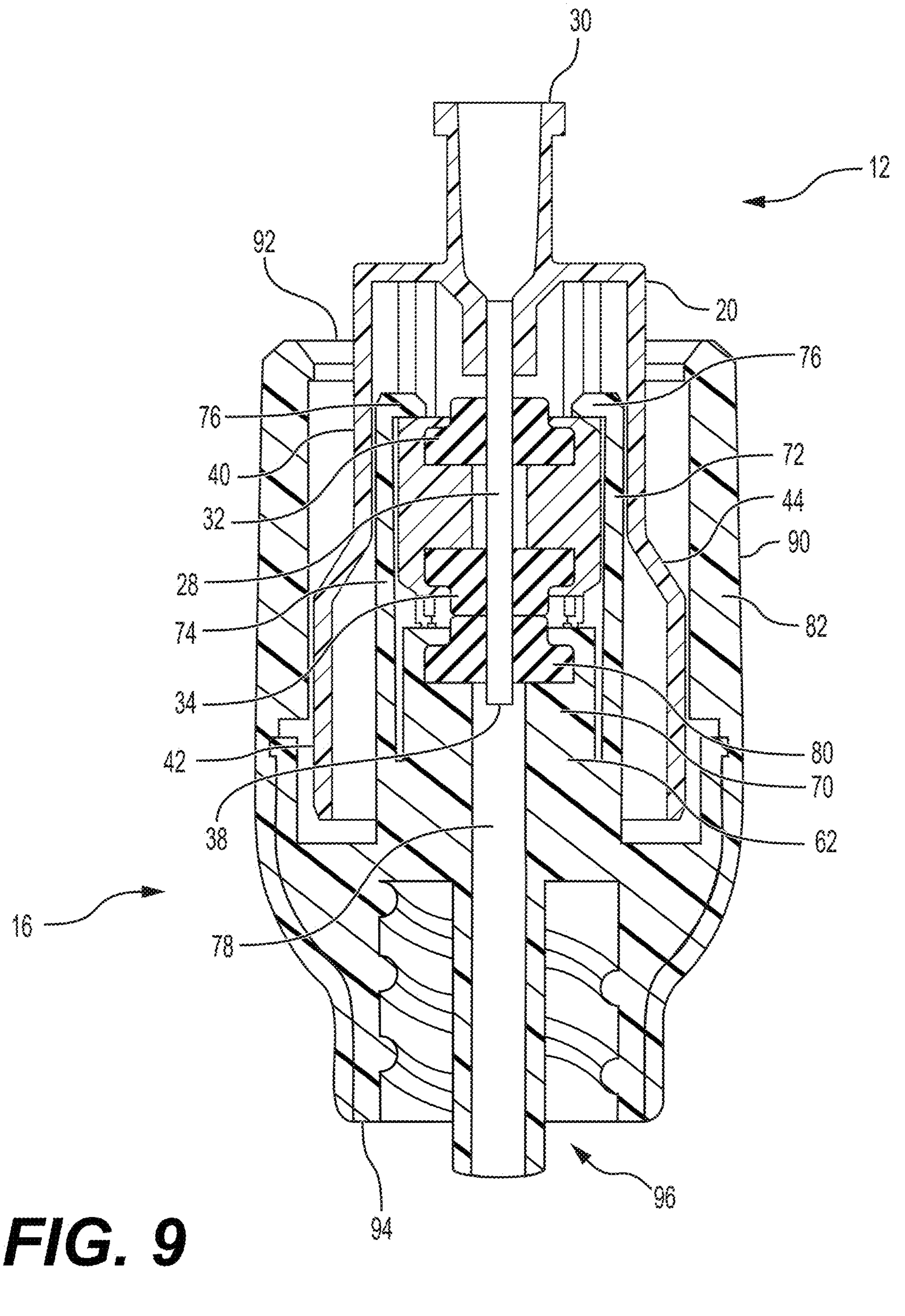
FIG. 9 is a cross-sectional view of a syringe adapter and a patient connector according to one aspect of the present invention.

Referring to FIGS. 1, 5, 6, 8, and 9 the patient connector 16 includes a body 90 having a first end 92 and a second end 94 and a patient connection 96 configured to secure the body 90 to a patient line (not shown). As shown in FIGS. 8 and 9, the patient connector 16 includes the same collet connection 62 as the vial adapter 14. The patient connector 16 is connected to the syringe adapter 12 in the same manner as the vial adapter discussed above and below. As shown in FIGS. 1, 5, 6, 8, and 9, the patient connection 96 may be a male luer connection configured to be secured to a female luer connection of an intravenous patient line, although other suitable connections may be utilized. As with the vial adapter 14, the patient connector 16 includes the indicator opening 84 defined by the body 90 of the patient connector 16. As shown in FIG. 5, the indicator 86 of the syringe adapter 12 is not visible through the indicator opening 84. However, as shown in FIG. 6, once the syringe adapter 12 is fully secured to the patient connector 16, the indicator 86 is visible through the indicator opening 84.

Figure 7:
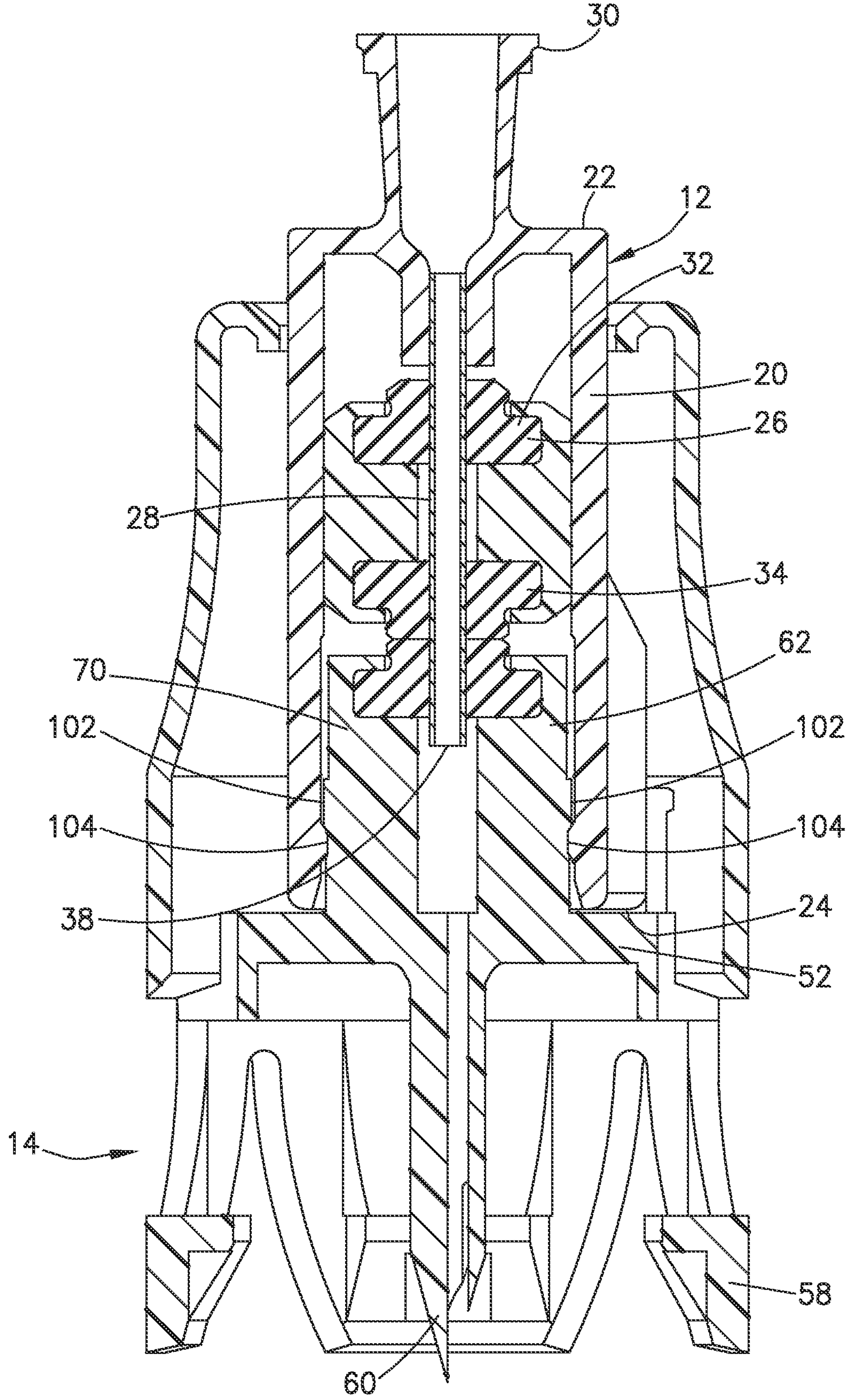
FIG. 7 is a cross-sectional view a syringe adapter and a vial adapter according to one aspect of the present invention, showing a connector feature.

Referring to FIG. 7, the vial adapter 14 may further include a projection 102 configured to engage a corresponding projection 104 within the housing 20 of the syringe adapter 12 to further secure the vial adapter 14 to the syringe adapter 12. The projections 102, 104 may form a snap-fit connection between the vial adapter 14 and the syringe adapter 12 to provide a secure connection when the membrane housing 26 is in the second position.

Figure 2:
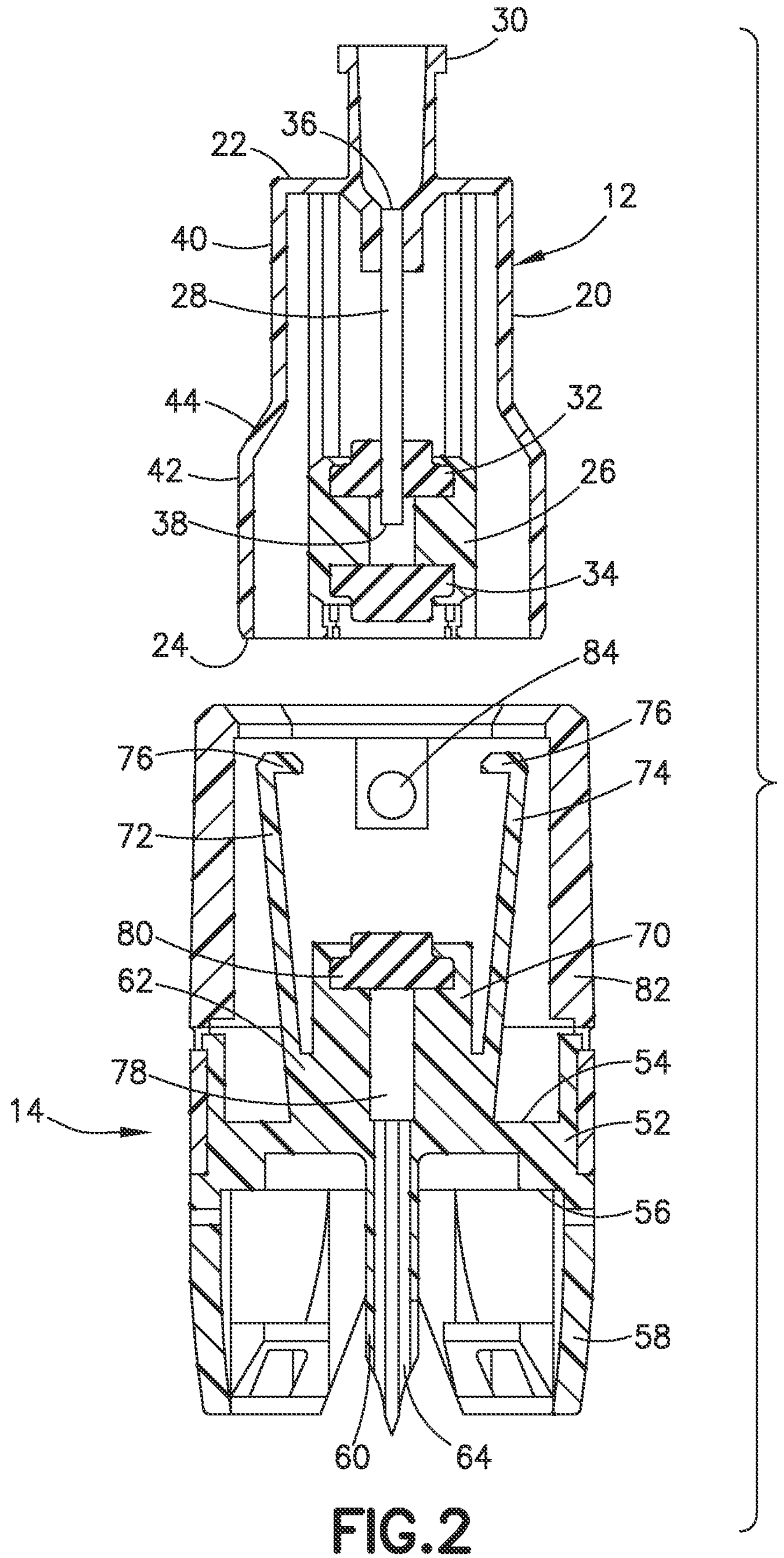
FIG. 2 is a cross-sectional view of a syringe adapter and vial adapter according to one aspect of the present invention, showing the syringe adapter and vial adapter prior to connection.
Figure 3:
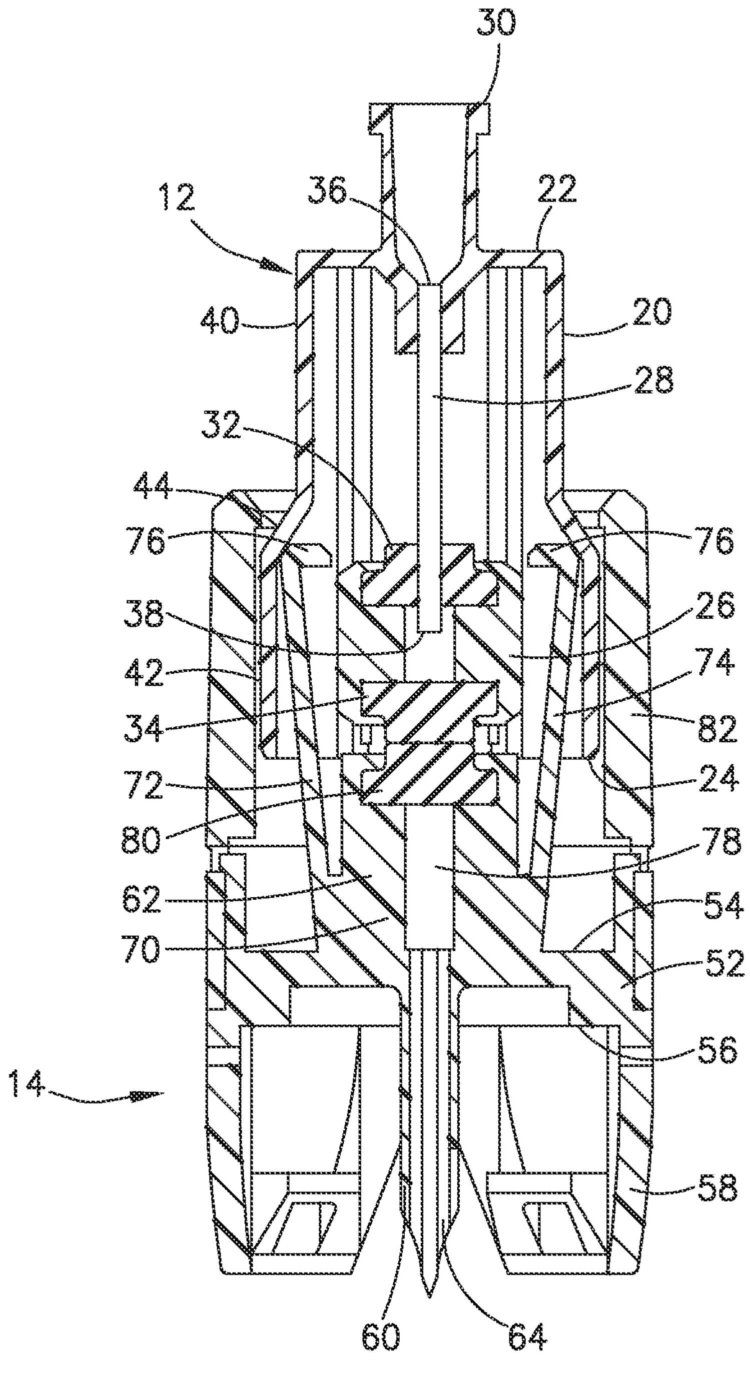
FIG. 3 is a cross-sectional view of a syringe adapter and vial adapter according to one aspect of the present invention, showing the syringe adapter and vial adapter being connected.
Figure 4:
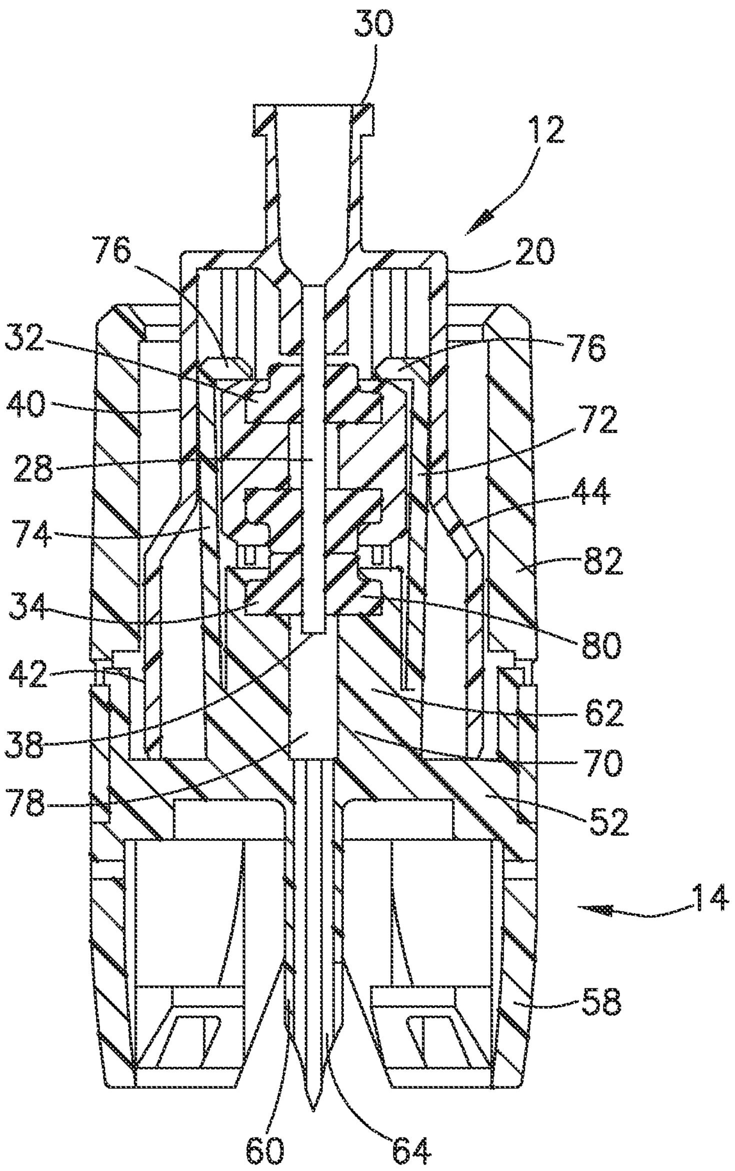
FIG. 4 is a cross-sectional view of a syringe adapter and vial adapter according to one aspect of the present invention, showing the syringe adapter and vial adapter connected.

Referring to FIGS. 2-4, the syringe adapter 12 is secured to the vial adapter 14 by inserting the syringe adapter 12 into the collet housing 82 such that the arms 72, 74 of the collet connection 62 are received within the housing 20 the syringe adapter 12. As shown in FIG. 3, as the collect connection 62 is inserted into the housing 20 of the syringe adapter 12 the arms 72, 74 are in the first position and are able to receive the membrane housing 26. When the arms 72, 74 of the collet connection 62 reach the transition portion 44 of the housing 20 of the syringe adapter 12, the arms 72, 74 are forced radially inward from the first position of the collet connection 62 to the second position of the collet connection 62. As the vial adapter 14 is further inserted into the syringe adapter 12 and towards the first end 22 of the housing 20 of the syringe adapter 12, the projections 76 of the arms 72, 74 of the collet connection 62 engage the membrane housing 26 and compress the second membrane 34 against the collet membrane 80 to form a sealed connection that allows for the closed transfer of fluid through the vial adapter 14 and syringe adapter 12. When the collet connection 62 is fully inserted into the syringe adapter 12 with the membrane housing 26 in the second position, as shown in FIG. 4, the cannula 28 extends through the second membrane 34, collet membrane 80, and into the passageway 64 of the vial spike 60 thereby providing fluid communication between the cannula 28 and the vial spike 60. The connection steps are reversed to disconnect the vial adapter 14 from the syringe adapter 12.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A system for closed transfer of fluids comprising:

a patient connector comprising:
- a body having a first end and a second end;
- a patient connection extending from the second end of the body, the patient connection configured to secure the body to a patient line; and
- a collet connection extending toward the first end of the body; and a syringe adapter comprising:
- a housing having a first end and a second end;
- a membrane housing positioned within the housing, the membrane housing moveable between a first position and a second position, the membrane housing including at least one membrane;
- a cannula positioned within the housing, the cannula having a first end and a second end, the second end of the cannula positioned within the membrane housing when the membrane housing is in the first position and positioned outside of the membrane housing when the membrane housing is in the second position; and
- a syringe connection extending from the first end of the housing, the syringe connection configured to be secured to a syringe barrel, wherein the collet connection is moveable between a first position where the collet connection is configured to receive the membrane housing and a second position where the collet connection is configured to be secured to the membrane housing, and wherein the collet connection comprises a collet body and first and second arms extending from the collet body away toward the first end of the body of the patient connector, the first and second arms defining a space configured to receive the membrane housing.

2. The system of claim 1, wherein the housing of the syringe adapter comprises a first portion positioned adjacent to the first end of the housing and a second portion positioned adjacent to the second end of the housing, the first portion of the housing having a smaller internal diameter relative to the internal diameter of the second portion of the housing, and wherein the collet connection is in the first position when the collet connection is positioned within the second portion of the housing and in the second position when the collet connection is positioned within the first portion of the housing.

3. The system of claim 2, wherein the collet connection is moveable radially inward when transitioning from the first position to the second position.

4. The system of claim 3, wherein the housing comprises a transition portion positioned between the first and second portions of the housing, the transition portion configured to engage the collet connection to move the collet connection from the first position to the second position when the collet connection is positioned within the housing of the syringe adapter.

5. The system of claim 4, wherein the transition portion is frusto- conical.

6. The system of claim 1, wherein the first and second arms each include a projection extending radially inward, the projection configured to engage the membrane housing when the collet connection is in the second position with the membrane housing received within the space.

7. The system of claim 1, wherein the collet body defines a passageway in fluid communication with the patient connection, the collet body further comprising a collet membrane configured to engage the membrane of the of the syringe adapter.

8. The system of claim 1, wherein the patient connector further comprises a collet housing extending toward the first end of the body, the collet connection positioned within the collet housing, the collet housing configured to receive a portion of the housing of the syringe adapter.

9. The system of claim 8, wherein the collet housing defines an indicator opening and the housing of the syringe adapter includes an indicator, the indicator configured to be visible via the indicator opening when the collet connection is in the second position.

10. The system of claim 1, wherein the patient connector further comprises a projection configured to engage a corresponding projection within the housing of the syringe adapter to secure the patient connector to the syringe adapter.

* * * * *